United States Patent
Nakamori et al.

(10) Patent No.: US 12,253,407 B2
(45) Date of Patent: Mar. 18, 2025

(54) VIBRATION DETECTION THROUGH CORRELATION OF NODAL MEASUREMENTS OF A PHYSICAL QUANTITY

(71) Applicant: MITSUBISHI HEAVY INDUSTRIES, LTD., Tokyo (JP)

(72) Inventors: Tomohito Nakamori, Tokyo (JP); Keisuke Matsuyama, Tokyo (JP); Hiroshi Gotoda, Tokyo (JP); Takuya Kurosaka, Tokyo (JP); Shinga Masuda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 67 days.

(21) Appl. No.: 17/914,977

(22) PCT Filed: Mar. 26, 2021

(86) PCT No.: PCT/JP2021/013011
§ 371 (c)(1),
(2) Date: Sep. 27, 2022

(87) PCT Pub. No.: WO2021/200702
PCT Pub. Date: Oct. 7, 2021

(65) Prior Publication Data
US 2023/0152149 A1  May 18, 2023

(30) Foreign Application Priority Data
Mar. 31, 2020 (JP) .................... 2020-062269

(51) Int. Cl.
*G01H 5/00* (2006.01)
*F01D 25/00* (2006.01)
(Continued)

(52) U.S. Cl.
CPC ............ *G01H 5/00* (2013.01); *F01D 25/00* (2013.01); *F02C 1/00* (2013.01); *F02C 6/00* (2013.01);
(Continued)

(58) Field of Classification Search
CPC .. G01H 1/08; G01H 5/00; F01D 25/00; F02C 7/00; F02C 1/00; F02C 6/00; F02C 9/00; G01M 99/00
(Continued)

(56) References Cited

U.S. PATENT DOCUMENTS

| | | | |
|---|---|---|---|
| 2014/0347043 A1 | 11/2014 | Chana | |
| 2015/0168230 A1* | 6/2015 | DeSilva | F23N 5/003 374/117 |
| 2019/0171187 A1* | 6/2019 | Cella | G06N 3/126 |

FOREIGN PATENT DOCUMENTS

| | | | |
|---|---|---|---|
| JP | 01101418 A | * | 9/1998 |
| JP | 2017-134019 A | | 8/2017 |

(Continued)

OTHER PUBLICATIONS

Translation JP2019174095 (Year: 2019).*
(Continued)

*Primary Examiner* — Xin Y Zhong
*Assistant Examiner* — Monica S Young
(74) *Attorney, Agent, or Firm* — Osha Bergman Watanabe & Burton LLP

(57) ABSTRACT

A sign detection device includes: a plurality of sensors disposed at a plurality of positions on a detection target object and configured to measure physical quantities at each position; a data acquisition unit for acquiring time-series fluctuation data of the physical quantities from the plurality of sensors; a calculation unit for calculating, from the time-series fluctuation data, a parameter indicating a corre- (Continued)

lation between the physical quantities at arbitrary two positions among the plurality of positions; and a detection unit for detecting a sign of sudden change in vibration of the detection object based on the parameter.

6 Claims, 8 Drawing Sheets

(51) Int. Cl.
  *F02C 1/00* (2006.01)
  *F02C 6/00* (2006.01)
  *F02C 7/00* (2006.01)
  *F02C 9/00* (2006.01)
  *G01H 1/08* (2006.01)
  *G01M 99/00* (2011.01)

(52) U.S. Cl.
  CPC .................. *F02C 7/00* (2013.01); *F02C 9/00* (2013.01); *G01H 1/08* (2013.01); *G01M 99/00* (2013.01)

(58) Field of Classification Search
  USPC ...................................................... 73/861.27
  See application file for complete search history.

(56) References Cited

FOREIGN PATENT DOCUMENTS

| JP | 2018018359 A | * | 2/2018 | |
|----|--------------|---|--------|---|
| JP | 2018080621 A | * | 5/2018 | |
| JP | 2019174094 A | * | 10/2019 | |
| JP | 2019174095 A | * | 10/2019 | |
| WO | WO-2014091956 A1 | * | 6/2014 | ............. G01H 1/003 |

OTHER PUBLICATIONS

Translation JP-01101418-A (Year: 1998).*
JP_2018018359 translation (Year: 2018).*
Office Action in counterpart Japanese Application No. 2020-062269, dated Feb. 6, 2024 (8 pages).
Office Action issued in Corresponding Chinese Application No. 202180024570.2, dated Jan. 4, 2025 (26 pages with English Translation).
Office Action issued in counterpart Chinese Patent Application No. 202180024570.2 mailed Oct. 16, 2024 (21 pages).

* cited by examiner

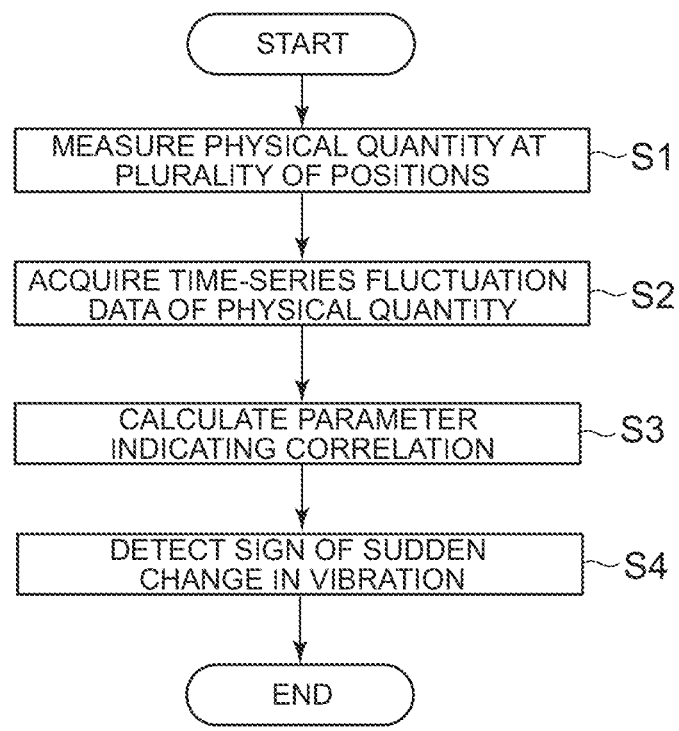

VIBRATION DETECTION THROUGH CORRELATION OF NODAL MEASUREMENTS OF A PHYSICAL QUANTITY

TECHNICAL FIELD

The present disclosure relates to a sign detection device and a sign detection method for detecting a sign of sudden change in vibration.

This application claims priority based on Japanese Patent Application No. 2020-062269 filed with Japan Patent Office on Mar. 31, 2020, the contents of which are incorporated herein by reference.

BACKGROUND

In machines such as gas turbines, steam turbines, engines, boilers, aircrafts, and compressors, combustion vibrations and shaft vibrations may occur in combustors, compressors, blades, and the like. Among these vibrations, unstable vibrations (sudden change in vibrations) that tend to change suddenly reach the limit cycle in a short time after the vibration increases. When the limit cycle is reached, it leads to a trip and puts a heavy burden on the equipment.

Therefore, it is desirable to avoid such sudden change in vibration at an early stage. However, since the vibration increase reaches the limit cycle in short time, sudden change in vibration may not be avoided by the control after the vibration increase is detected. In order to avoid sudden change in vibration, it is necessary to detect the sign sufficiently before the occurrence of sudden change in vibration.

In recent years, a detection technique aimed at detecting sudden change in vibration in advance has been proposed. For example, Patent Document 1 discloses a device for detecting combustion vibration using a value related to a pressure in a combustor of a gas turbine. This device is configured to acquire the value related to the pressure in the combustor of the gas turbine, calculate the network entropy, and detect the occurrence of combustion vibration when the network entropy falls below a threshold value.

CITATION LIST

Patent Literature

Patent Document 1: JP2018-80621A

SUMMARY

Technical Problem

As a result of diligent studies by the inventors of the present application, it has been found that the correlation between physical quantities (for example, pressure) at a plurality of positions is important in detecting signs of sudden change in vibration. By using a parameter indicating such a correlation, it is possible to detect a sign of sudden change in vibration.

However, even if the time-series fluctuation data of the physical quantity (value related to the pressure in the combustor) at one position is acquired and the network entropy is calculated as in Patent Document 1, since the correlation between the physical quantities at a plurality of positions is not taken into consideration, it is difficult to detect the sign of sudden change in vibration sufficiently before the occurrence of sudden change in vibration.

In view of the above circumstances, an object of the present disclosure is to detect a sudden change in vibration sufficiently prior to the occurrence of the sudden change in vibration.

Solution to Problem

A sign detection device according to the present disclosure includes: a plurality of sensors disposed at a plurality of positions on a detection target object and configured to measure physical quantities at each position; a data acquisition unit for acquiring time-series fluctuation data of the physical quantities from the plurality of sensors; a calculation unit for calculating, from the time-series fluctuation data, a parameter indicating a correlation between the physical quantities at arbitrary two positions among the plurality of positions; and a detection unit for detecting a sign of sudden change in vibration of the detection target object based on the parameter.

A sign detection method according to the present disclosure includes: a step of measuring, by sensors disposed at a plurality of positions on a detection target object, physical quantities at each position; a step of acquiring time-series fluctuation data of the physical quantities from a plurality of the sensors; a step of calculating a parameter indicating correlation between the physical quantities at arbitrary two positions among the plurality of positions from the time-series fluctuation data; and a step of detecting a sign of sudden change in vibration of the detection target object based on the parameter.

Advantageous Effects

According to the present disclosure, it is possible to detect sudden change in vibration sufficiently prior to the occurrence of the sudden change in vibration.

BRIEF DESCRIPTION OF DRAWINGS

FIG. 8 is a flowchart showing a procedure of a sign detection method according to an embodiment.

DETAILED DESCRIPTION

Embodiments of the present disclosure will now be described in detail with reference to the accompanying drawings. It is intended, however, that unless particularly specified, dimensions, materials, shapes, relative positions and the like of components described in the embodiments shall be interpreted as illustrative only and not limitative of the scope of the present disclosure.

For example, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same", "equal" and "uniform" shall not be construed as indicating only the state in which the feature is strictly equal, but also includes a state in which there is a tolerance or a difference that can still achieve the same function.

Furthermore, in the present specification, an expression of a shape such as a rectangular shape or a cylindrical shape shall not be construed as only the geometrically strict shape, but also includes a shape with unevenness or chamfered corners within the range in which the same effect can be achieved.

Furthermore, in the present specification, an expression such as "comprise", "equipped", "include", "have", "contain" and "have" are not intended to be exclusive of other components.

(Sign Detection Device)

Figure 1:
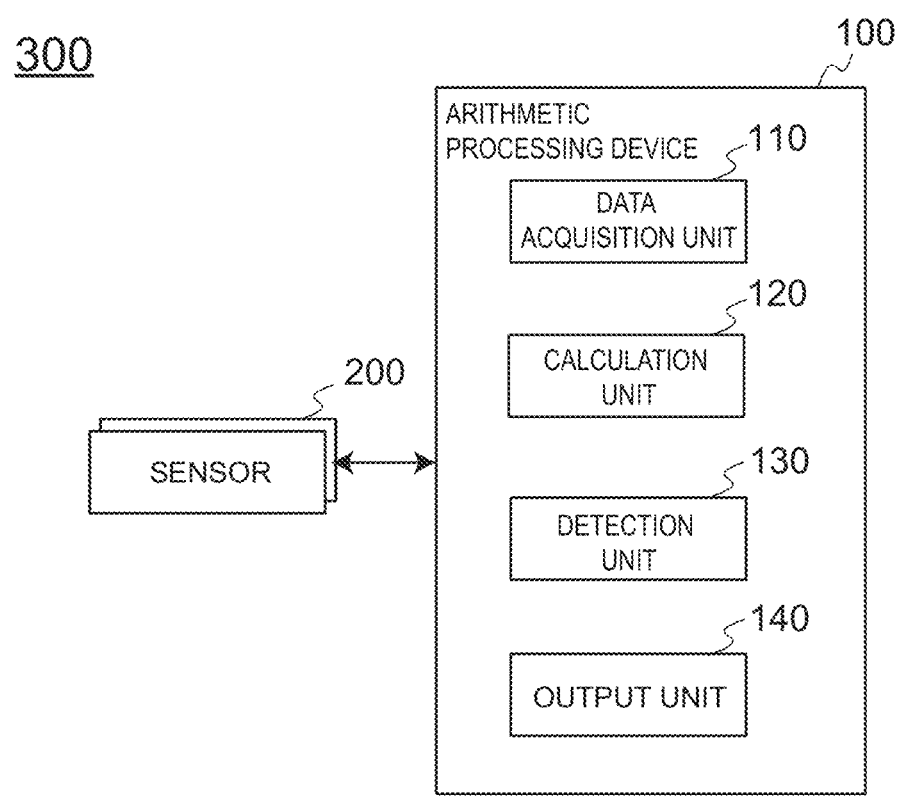
FIG. 1 is a block diagram showing a configuration of a sign detection device according to an embodiment.

Hereinafter, a sign detection device 300 according to an embodiment will be described. FIG. 1 is a block diagram showing a configuration of the sign detection device 300 according to an embodiment.

As shown in FIG. 1, the sign detection device 300 includes a plurality of sensors 200 and an arithmetic processing device 100 configured to execute arithmetic processing for detecting a sign of sudden change in vibration. The sensor 200 is a sensor configured to measure a physical quantity in a detection target object.

The plurality of sensors 200 are arranged at a plurality of positions on the detection target object, and measure physical quantities at each position. The physical quantity measured by the sensor 200 is, for example, one or more of pressure, strain, acceleration, velocity, and displacement. The physical quantities measured by the sensor 200 are not limited to these physical quantities. The physical quantity measured by the sensor 200 may be any physical quantity that is highly related to the occurrence of combustion vibration.

The arithmetic processing device 100 is, for example, a computer including a CPU (Central Processing Unit), a RAM (Random Access Memory), a ROM (Read Only Memory), and the like. In the arithmetic processing device 100, a processor (CPU) realizes various functions described later by executing a program stored in a memory (RAM or ROM).

Hereinafter, the functional configuration of the arithmetic processing device 100 will be described. As shown in FIG. 1, the arithmetic processing device 100 functions as a data acquisition unit 110, a calculation unit 120, a detection unit 130, and an output unit 140.

The data acquisition unit 110 is configured to acquire time-series fluctuation data of physical quantities from the plurality of sensors 200. The time-series fluctuation data is measurement data sampled at a plurality of timings (for example, 100 or more timings) in the latest past unit time (for example, 1 second).

The calculation unit 120 is configured to calculate a parameter indicating a correlation from the time-series fluctuation data of the physical quantity acquired by the data acquisition unit 110. The parameter indicating the correlation is a parameter indicating a correlation between the physical quantities at arbitrary two positions among the plurality of positions where the sensors 200 are arranged.

The parameter indicating the correlation may be a correlation coefficient $C_{ij}$, or may be data obtained by further arithmetically processing the correlation coefficient $C_{ij}$ (for example, a link strength $\rho$). The correlation coefficient $C_{ij}$ and the link strength $\rho$ will be described later. Further, the parameter indicating the correlation may be coherence showing the degree of similarity of the fluctuation characteristics such as when pieces of time-series fluctuation data are compared with each other. Further, the deterministic nature of the cross-recurrence plot, the order parameter, the Maximal information coefficient, and the like may be applied to the parameter indicating the correlation.

The detection unit 130 is configured to detect a sign of sudden change in vibration of the detection target object based on the parameter indicating the correlation calculated by the calculation unit 120. The specific detection method will be described later.

The output unit 140 is configured to output image data indicating a vibration state of the detection target object. For example, the output unit 140 outputs image data to a display device (not shown) or a display unit (not shown) to display the image data. Specific examples of image data will be described later. The output unit 140 may be configured to output audio data (for example, sound that notifies a sign of sudden change in vibration). In this case, the output unit 140 is configured to output audio data to an audio output device such as a speaker.

Further, the output unit 140 may be configured to output a predetermined signal when the detection unit 130 detects a sign of sudden change in vibration. The predetermined signal is a signal that is effective in avoiding sudden change in vibrations such as, for example, a stop signal for stopping the operation of the detection target object, an output control signal for reducing the output of the detection target object, or a notification signal for notifying the user that it is a sign of sudden change in vibration.

Further, the output unit 140 may be configured to output information regarding maintenance estimated from the parameter indicating the correlation. The information related to maintenance is, for example, information such as parts to be replaced, recommended replacement time, and presence of failure. Such image data, predetermined signals, and information related to maintenance are generated, for example, based on the calculation result of the calculation unit 120 and the detection result of the detection unit 130.

(Arrangement Example of Detection Target Object and Sensors)

Figure 2:
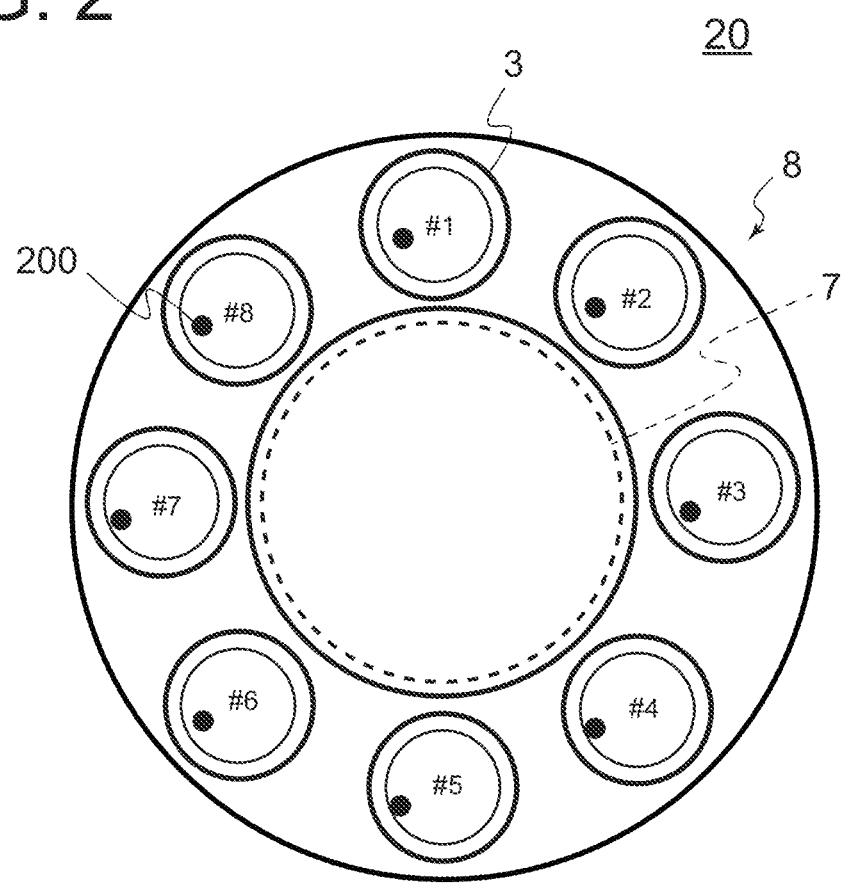
FIG. 2 is a schematic diagram showing an arrangement example of sensors of a sign detection device according to an embodiment.
Figure 3:
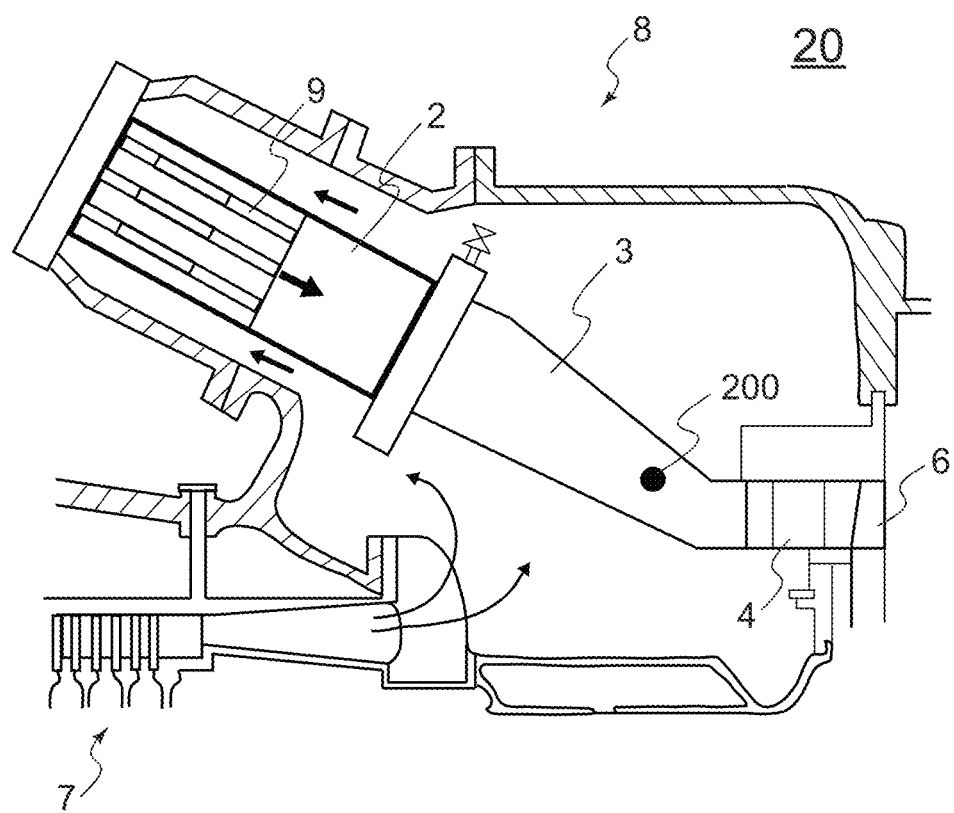
FIG. 3 is a schematic cross-sectional view showing an arrangement example of sensors of a sign detection device according to an embodiment.

Hereinafter, an arrangement example of the detection target object and the sensors 200 according to the embodiment will be described. FIG. 2 is a schematic diagram showing an arrangement example of the sensors 200 of the sign detection device 300 according to the embodiment. FIG. 2 shows a cross-section along a direction perpendicular to the turbine shaft of the gas turbine 20. FIG. 3 is a schematic cross-sectional view showing an arrangement example of the sensors 200 of the sign detection device 300 according to the embodiment. FIG. 3 shows a cross-section of the gas turbine 20 along the turbine shaft.

In one embodiment, the detection target object of the sign detection device 300 may be, for example, the gas turbine 20 shown in FIGS. 2 and 3. The detection target object may not be the gas turbine 20, but may be, for example, a machine such as a steam turbine, an engine, a boiler, an aircraft, or a compressor.

As shown in FIGS. 2 and 3, the gas turbine 20 includes a compressor 7, a combustor 8, a stator vane 4, and a rotor blade 6. As shown in FIG. 2, the combustor 8 includes eight can-type combustors. In FIG. 2, the eight can-type combustors are numbered #1 to #8 according to the arrangement position. As shown in FIG. 3, the eight can-type combustors have a fuel nozzle 9, a combustor basket 2, and a transition piece 3, respectively. The sensor 200 is a pressure sensor for measuring the pressure inside the combustor 8. The sensor 200 is arranged in each of the eight transition pieces 3.

In this example, the sensor 200 is arranged in the transition piece 3 of the combustor 8 of the gas turbine 20. However, the arrangement of the sensors 200 is not limited to such an example. The sensor 200 may be arranged at a position where a vibration mode can be observed, and may be arranged in a compressor, a blade, a bearing, or the like depending on the type of the detection target object.

(Specific Example of Parameter Indicating Correlation)

Hereinafter, specific examples of the parameters (correlation coefficient and link strength) indicating the correlation acquired by the calculation unit 120 by the calculation will be described.

First, the correlation between the physical quantities corresponding to the positions of the plurality of sensors 200 acquired by the data acquisition unit 110 will be described. According to the inventors of the present application, the correlation between physical quantities can be interpreted as an undirected weighted complex network in which each of a plurality of positions is a node. For example, the correlation between physical quantities can be expressed as an adjacency matrix A (A is represented by bold letters indicating vectors; the same applies hereinafter).

As shown in Equation (1) below, the adjacency matrix A is defined as an n×n square matrix. In the adjacency matrix A, any matrix element $w_{ij}$ shows the correlation between the i-th physical quantity and the j-th physical quantity. n corresponds to the number of physical quantities (that is, the number of sensors 200).

$$A = \begin{pmatrix} w_{11} & \cdots & w_{1n} \\ \vdots & \ddots & \vdots \\ w_{n1} & \cdots & w_{nn} \end{pmatrix} \quad (1)$$

In the adjacency matrix A, the values of the diagonal components $w_{11}, w_{22}, \ldots w_{nn}$ are zero, and the matrix elements other than the diagonal components are values indicating the magnitude of the correlation coefficient (the matrix element in the i-th row and j-th column is the absolute value of the correlation coefficient $C_{ij}$). That is, the matrix element showing the relationship between the physical quantities at different positions is the absolute value of the correlation coefficient $C_{ij}$, and the matrix element showing the relationship between the physical quantities at the same position is zero. Even if the row and column numbers are exchanged, the correlation coefficient is basically the same. For example, $w_{24}$ and $w_{42}$ have the same value.

In the arrangement example of the sensors 200 shown in FIG. 2, since it has eight nodes #1 to #8, the adjacency matrix A is an 8×8 square matrix. For example, the correlation between the physical quantities measured in the #2 can-type combustor and the #4 can-type combustor is the matrix element $w_{24}$, that is, an absolute value in the correlation coefficient $C_{24}$.

The parameter indicating the correlation may be the correlation coefficient $C_{ij}$ showing the correlation of the fluctuations of the physical quantities at each position. The correlation coefficient $C_{ij}$ is expressed by, for example, Equation (2) below. Although Equation (2) shows an example when the physical quantity is pressure, the physical quantity may be a physical quantity other than pressure.

$$C_{ij} = \frac{\sum_{t=t_1}^{t_N} (p_i(t) - P_i)(p_j(t) - P_j)}{\sqrt{\sum_{t=t_1}^{t_N} (p_i(t))^2} \sqrt{\sum_{t=t_1}^{t_N} (p_j(t))^2}} \quad (2)$$

Here, N is the number of samplings (for example, 100 or more) per unit time (for example, 1 second). $p_i(t)$ indicates the instantaneous value of the pressure at the i-th position, and $p_j(t)$ indicates the instantaneous value of the pressure at the j-th position. $P_i$ is the time average value in the unit time of $p_i(t)$, and $P_j$ is the time average value in the unit time of $p_j(t)$. In addition, instead of the instantaneous value or the time average value of the pressure, the instantaneous value or the time average value of the fluctuation amount of the pressure may be applied.

The correlation coefficient $C_{ij}$ has a large value when the fluctuation patterns of the physical quantities at two positions are similar, and has a small value when they are not similar. Further, the value of the correlation coefficient $C_{ij}$ is normalized so as to be a value within the range of 0 or more and 1 or less. Therefore, the strength of the correlation can be determined from the correlation coefficient $C_{ij}$. The correlation coefficient $C_{ij}$ is not limited to the calculated value shown in Equation (2), and can be appropriately changed within a range that does not impair the essential significance.

The parameter indicating the correlation may be the link strength ρ. The link strength ρ is an index showing the degree of connection between the vertices of a network. The link strength ρ is expressed by, for example, Equation (3) below. n is the number of nodes.

$$\rho = \frac{\sum_{i=1}^{n} \sum_{j=1}^{n} w_{ij}}{n(n-1)} \quad (3)$$

The numerator of the link strength ρ is a value obtained by calculating the correlation coefficients $C_{ij}$ for all combinations of two positions selected from a plurality of positions and calculating the sum of those correlation coefficients. The sum of the correlation coefficients $C_{ij}$ is the same as the sum of the components $w_{ij}$ of the adjacency matrix A.

The denominator of the link strength ρ corresponds to the number of combinations. For example, in the arrangement example of the sensors 200 shown in FIG. 2, since it has eight nodes #1 to #8, the denominator of the link strength ρ is 56. In this case, since the link strength ρ is a value obtained by dividing the sum of 56 matrix elements by 56, it is a value obtained by normalizing the sum of the correlation coefficients. In this case, since the link strength ρ is calculated as a value within the range of 0 or more and 1 or less, it is advantageous in that the link strength ρ can be quantitatively grasped.

(Specific Example of Image Data)

Hereinafter, specific examples of image data output by the output unit 140 will be described. For example, the calculation unit 120 may calculate the correlation coefficients $C_{ij}$ for all combinations of two positions selected from a plurality of positions. In this case, the output unit 140 may output image data in which each position of the plurality of positions is associated with the correlation coefficient $C_{ij}$ calculated for each combination of the positions.

Figure 4:
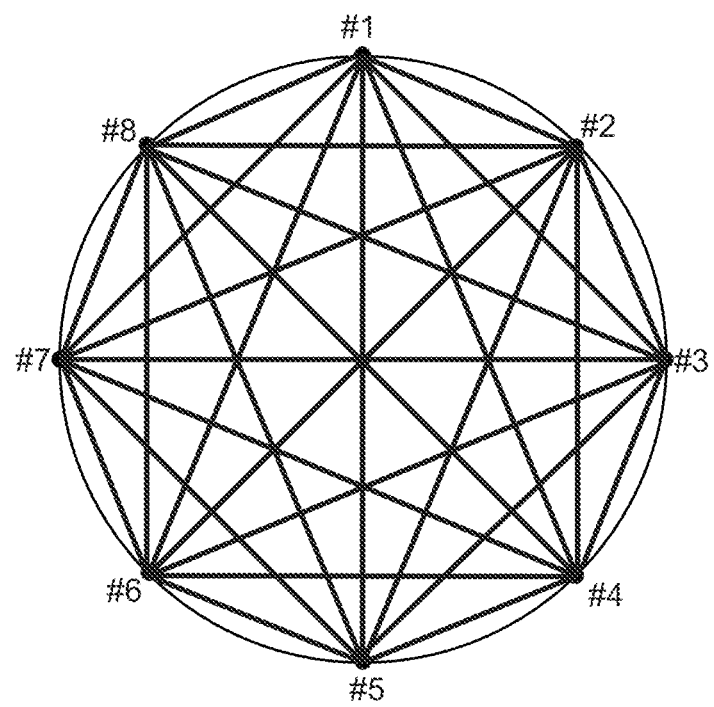
FIG. 4 is a diagram showing an example of image data output by a sign detection device according to an embodiment.
Figure 5:
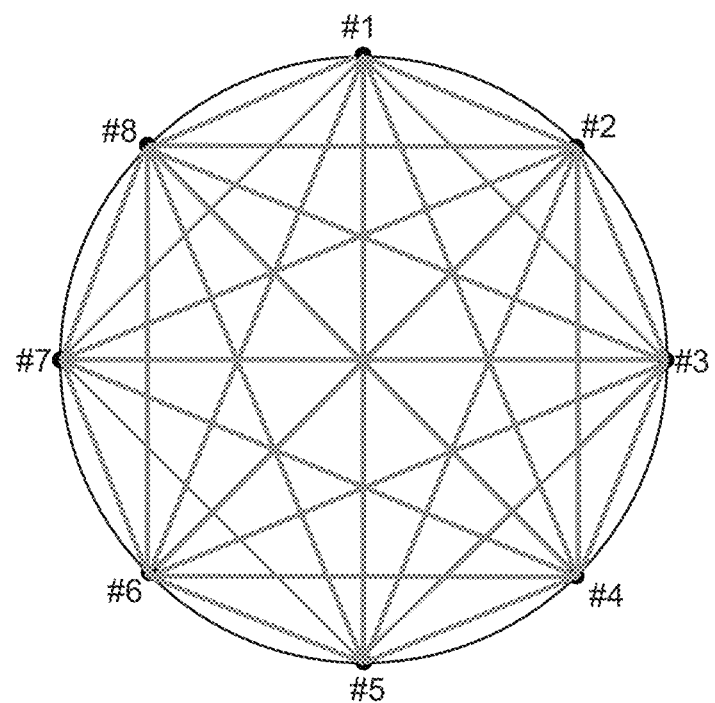
FIG. 5 is a diagram showing an example of image data output by a sign detection device according to an embodiment.
Figure 6A:
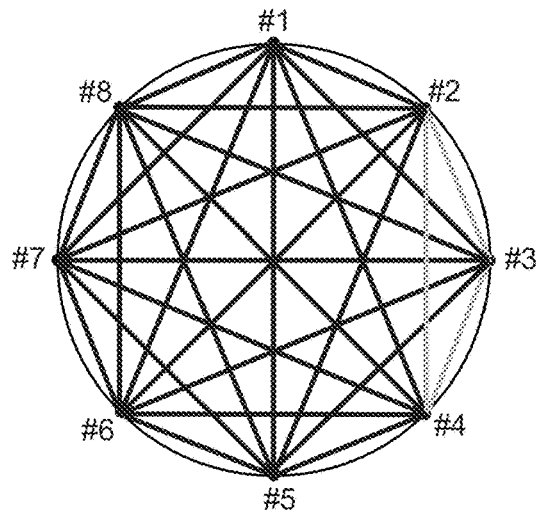
FIG. 6A is a diagram showing an example of image data output by a sign detection device according to an embodiment.
Figure 6B:
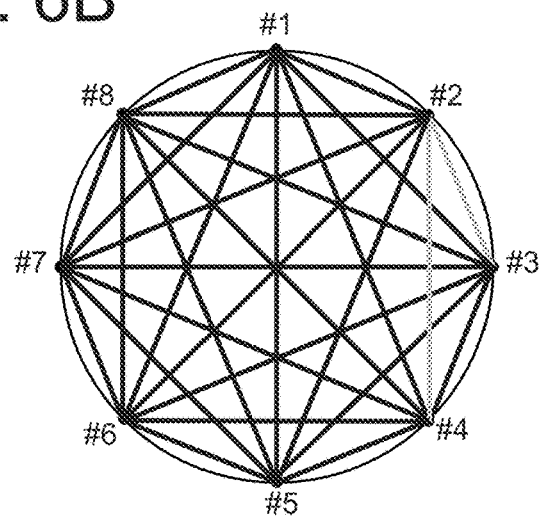
FIG. 6B is a diagram showing an example of image data output by a sign detection device according to an embodiment.
Figure 6C:
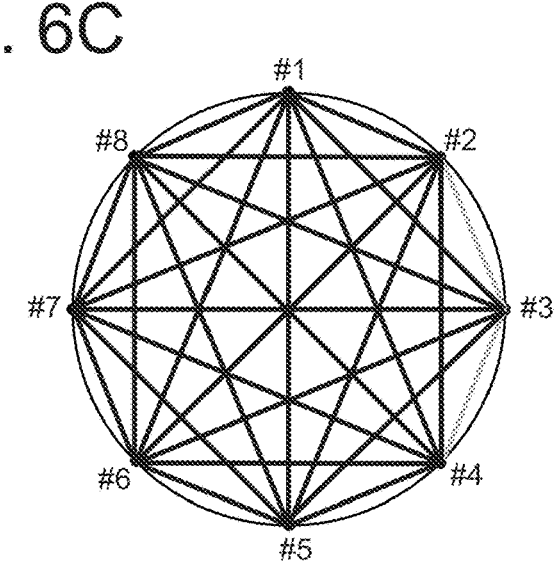
FIG. 6C is a diagram showing an example of image data output by a sign detection device according to an embodiment.

FIG. 4 is a diagram showing an example of the image data output by the sign detection device 300 according to the embodiment. FIG. 4 shows an example of an image displayed during stable combustion. FIG. 5 is a diagram showing an example of the image data output by the sign detection device 300 according to the embodiment. FIG. 5 shows an example of an image displayed during combustion vibration (combustion vibration includes sudden change in vibration). FIGS. 6A, 6B, and 6C are diagrams showing examples of the image data output by the sign detection device 300 according to the embodiment. These figures show image data at different times.

For example, as shown in FIGS. 4, 5, 6A, 6B, and 6C, the image data may be image data showing a figure in which a plurality of positions are arranged as nodes, and the nodes are connected by lines of different display formats according to the magnitude of the correlation coefficient $C_{ij}$.

For example, in the figures shown in FIGS. 4, 5, 6A, 6B, and 6C, when the magnitude of the correlation coefficient $C_{ij}$ is small, the nodes are connected by a black line, and when the magnitude of the correlation coefficient $C_{ij}$ is large, the nodes are connected by a gray line. Therefore, at the time of stable combustion, all the lines are black as shown in FIG. 4. On the other hand, at the time of combustion vibration, all the lines are gray as shown in FIG. 5. When it is ambiguous whether it is during stable combustion or combustion vibration, some lines are gray and others are black, as shown in FIGS. 6A, 6B, and 6C.

The different display formats may be a display format that can distinguish the magnitude of the correlation coefficient $C_{ij}$ by any one or more of, for example, color, shading, thickness, line type (solid line, dotted line, alternate long and short dash line). For example, the line connecting the nodes may be displayed as a red line when the correlation coefficient $C_{ij}$ is large, and may be displayed as a blue line when the correlation coefficient $C_{ij}$ is small. For example, the line connecting the nodes may be displayed as a solid line when the correlation coefficient $C_{ij}$ is large, and may be displayed as a dotted line when the correlation coefficient $C_{ij}$ is small.

In the illustrated example, the magnitude of the correlation coefficient $C_{ij}$ is distinguished by two types of lines, black and gray. However, in some embodiments, the line display format may change stepwise depending on the magnitude of the correlation coefficient $C_{ij}$. Further, the line display format may change depending on whether or not the magnitude of the correlation coefficient $C_{ij}$ exceeds a reference value, and the line display format may change in multiple steps according to the magnitude of the correlation coefficient $C_{ij}$.

It is preferable that the nodes indicated by the image data are arranged in a positional relationship corresponding to a plurality of positions of the actual physical quantities. For example, as shown in FIGS. 4, 5, 6A, 6B, and 6C, the image data may be image data in which nodes are arranged by simulating the arrangement of the sensors 200 in each can-type combustor (#1 to #8) of the combustor 8 included in the gas turbine 20.

The image data is not limited to the illustrated example. For example, in the image data, the magnitude of the correlation coefficient $C_{ij}$ between the physical quantities at each position may be indicated by a numerical value, a symbol, or the like. The image data may be, for example, image data shown in a display mode such as a round robin table (not shown).

By the way, referring to FIGS. 6A, 6B, and 6C, it can be seen from the color of the line connecting the nodes that the magnitude of the correlation coefficients $C_{23}$ ($C_{32}$), $C_{24}$ ($C_{42}$), and $C_{34}$ ($C_{43}$) mainly between #2, #3, and #4 is large. In this case, there is a possibility that combustion vibration can be suppressed by performing maintenance on the can-type combustors #2, #3, and #4. In this way, it is also possible to identify a part that may cause combustion vibration from the image data output by the output unit 140.

For example, the calculation unit 120 may calculate the correlation coefficients for all combinations of two positions selected from a plurality of positions (positions where the sensors 200 are arranged), and calculate the link strength ρ from the sum of the calculated correlation coefficients $C_{ij}$. In this case, the output unit 140 may output image data showing the temporal change of the link strength ρ calculated by the calculation unit 120.

Figure 7:
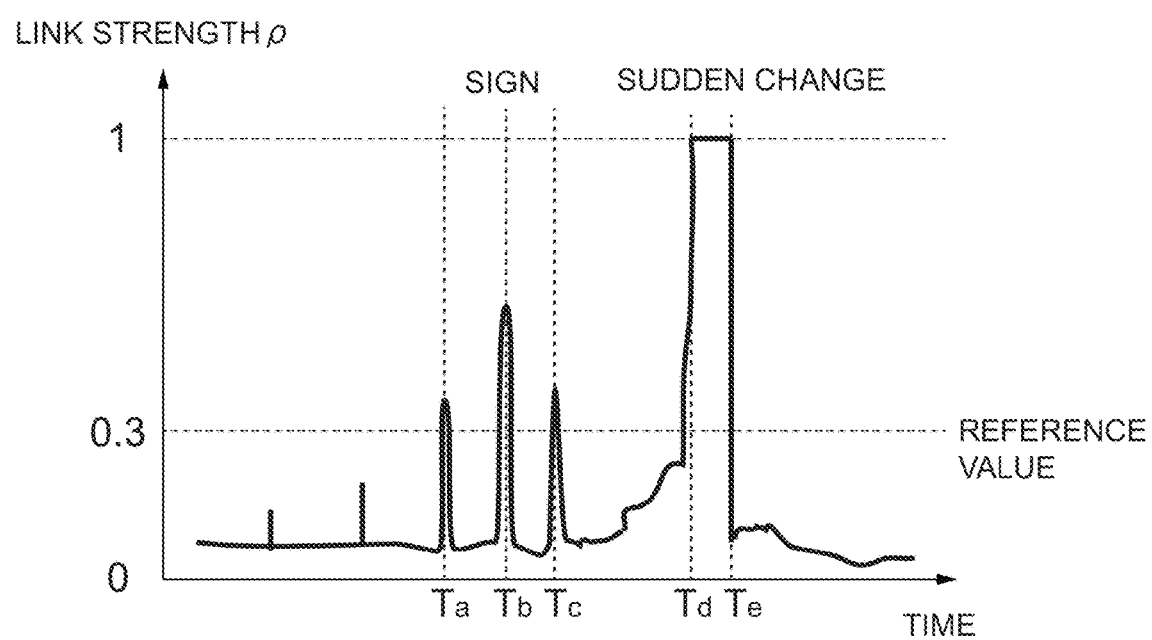
FIG. 7 is a diagram showing an example of image data output by a sign detection device according to an embodiment.

FIG. 7 is a diagram showing an example of the image data output by the sign detection device 300 according to the embodiment. This figure is a graph showing the temporal change of the link strength ρ calculated by the calculation unit 120. The horizontal axis shows time, and the vertical axis shows the magnitude of link strength ρ.

The link strength ρ is a value close to 1 during sudden change in vibration (for example, the time from time $T_d$ to time $T_e$), and is close to 0 (for example, about 0.1) under the normal situation. However, the link strength ρ may show a larger value (for example, a value of 0.3 or more) than the normal value before the sudden change in vibration (for example, time $T_a$, $T_b$, $T_c$). In such a case, the detection unit 130 or the operator looking at the image data may determine that a sign of sudden change in vibration has occurred.

(Specific Example of Detection of Sign of Sudden Change in Vibration)

The detection unit 130 detects a sign of sudden change in vibration based on the calculation result of the calculation unit 120. Hereinafter, a specific detection method will be described.

The detection unit 130 may detect a sign of sudden change in vibration based on the magnitude of the correlation coefficient $C_{ij}$. In this case, for example, the detection unit 130 may determine that it is a sign of sudden change in vibration when the magnitude of the correlation coefficient $C_{ij}$ is equal to or larger than the reference value, or when the number of combinations of the correlation coefficients $C_{ij}$ which are equal to or greater than the reference value exceeds a predetermined number (for example, n/2). The detection unit 130 may determine that it is a sign of sudden change in vibration when the duration of such a state exceeds a reference value. In this way, the sign of sudden change in vibration may be detected according to the magnitude of each correlation coefficient $C_{ij}$, the number of combinations of the correlation coefficients $C_{ij}$ that exceed the reference value, or the duration of the state.

The detection unit 130 may detect a sign of sudden change in vibration based on the link strength ρ. In this case, for example, the detection unit 130 may determine whether it is a sign of sudden change in vibration depending on whether or not the value of the link strength ρ exceeds a reference value. For example, in the examples shown in FIGS. 6A, 6B, and 6C, it may be difficult to discriminate when a subtle change occurs even if the magnitude of the correlation coefficient $C_{ij}$ is focused on.

On the other hand, in the detection method focusing on the link strength ρ, the discrimination standard can be uniquely set. For example, as shown in FIG. 7, it is easy to discriminate when determining that it is a sign of sudden change in vibration when the magnitude of the link strength ρ is a reference value (for example, 0.3) or more. Further, according to such a configuration, since the link strength ρ based on the correlation coefficient $C_{ij}$ of all combinations of the plurality of positions is used for the sign detection, it is possible to perform sign detection that evaluates the overall state of the detection target object instead of sign detection focusing on only between the specific positions of the detection target object.

The detection unit 130 may be configured to detect a sign of sudden change in vibration based on the parameter (correlation coefficient $C_{ij}$ and link strength ρ) indicating the correlation calculated by the calculation unit 120 and the amplitude information of the physical quantity indicated by the time-series fluctuation data acquired by the data acquisition unit 110. The amplitude information of the physical quantity is information on the amplitude of the physical quantity, and is, for example, information indicating the maximum value of the fluctuation component of the physical quantity, the root mean square of the fluctuation component of the physical quantity, and the like. The amplitude of the physical quantity means the deviation from the time average value, that is, the magnitude of the fluctuation. It should be noted that the amplitude of a physical quantity is rarely a constant value like the amplitude of a waveform having a uniform amplitude or period such as a sine wave or a square wave.

Here, a case where the detection target object is the gas turbine 20 will be described as an example. The detection unit 130 or the calculation unit 120 may correct the link strength ρ so that the link strength ρ is increased when the combustion temperature is low and the link strength ρ is decreased when the combustion temperature is high using the amplitude information of the physical quantity (pressure or temperature) indicated by the time-series data. The correction may be a calculation that multiplies a weighting factor. This improves the reliability as an index indicating a sign of sudden change in vibration.

Further, instead of correcting the link strength, the amplitude information of the physical quantity (pressure or temperature) indicated by the time-series data may be used as a material for verifying the validity of the link strength ρ. For example, the detection unit 130 may be configured to determine that it is a sign of sudden change in vibration only when the amplitude information is equal to or higher than the reference value and the link strength ρ is higher than the reference value.

The amplitude information of physical quantities may be used for correction of the correlation coefficient $C_{ij}$ or verification of validity. That is, the detection method of the detection unit 130 is not limited to the detection method that combines the amplitude information of the physical quantity and the link strength ρ as described above. The output unit 140 may be configured to output image data after adjusting the parameter indicating correlation based on such amplitude information of physical quantities.

For example, in the component $w_{ij}$ of the adjacency matrix A shown in Equation (1), the matrix element other than the diagonal component may be a value converted based on the amplitude information instead of the absolute value of the correlation coefficient $C_{ij}$. For example, the matrix elements other than the diagonal components of the adjacent matrix A may be 1 when the conditions that the correlation coefficient $C_{ij}$ is 0.5 or more and the average value $P_{ij}$ of the maximum value of the amplitude of the physical quantity is 0.4 or more are satisfied and may be 0 when the conditions are not satisfied. The average value $P_{ij}$ of the maximum value of the amplitude of the physical quantity is a value obtained by adding the maximum value of $p_i(t)$ and the maximum value of $p_j(t)$ and dividing the same by two.

When such an adjacency matrix A is used, the matrix element becomes 1 or 0. Therefore, in the image data output by the output unit 140, the line connecting the nodes may be displayed so that 1 or 0 can be distinguished by the presence or absence of a line (for example, a display format in which a line is displayed when the value is 1 and a line is not displayed when the value is 0) or by two types of line (for example, a display format in which a blue line is displayed when the value is 1 and a red line is displayed when the value is 0). By using such amplitude information of physical quantities, it is possible to improve the accuracy of sign detection of sudden change in vibration.

(Sign Detection Method)

Hereinafter, a specific example of the sign detection method will be described with reference to FIG. 8. FIG. 8 is a flowchart showing the procedure of the sign detection method according to the embodiment. It should be noted that some or all of the procedures described below may be performed manually by the user. In the sign detection method described below, each procedure can be appropriately modified so as to correspond to the process executed by the sign detection device 300 described above. In the following description, the description overlapping with the description of the sign detection device 300 will be omitted.

As shown in FIG. 8, first, a plurality of sensors 200 arranged at a plurality of positions on the detection target object measure physical quantities at each position (step S1). Time-series fluctuation data of the physical quantity measured by each sensor 200 is acquired from the plurality of sensors 200 (step S2).

Next, a parameter indicating the correlation between the physical quantities at arbitrary two positions among the plurality of positions is calculated from the time-series fluctuation data (step S3). Specifically, the parameter indicating the correlation such as the magnitude of the correlation coefficient $C_{ij}$ of each combination and the link strength of the entire detection target object are calculated. In addition to the parameter indicating the correlation, calculations such as corrections based on the number of combinations of the correlation coefficients $C_{ij}$ that are equal to or higher than the reference value, the duration of the state, and the amplitude of the physical quantity may be performed. A sign of sudden change in vibration of the detection target object is detected based on the parameter indicating the correlation calculated in step S3 (step S4).

These steps S1 to S4 may be repeatedly executed periodically. In this way, it is possible to monitor the signs of sudden change in vibration. When a sign of sudden change in vibration is detected, the above-mentioned predetermined signal (stop signal, notification signal, and the like) may be output. Further, the above-mentioned image data may be output and the image may be displayed on a display device or the like.

The present disclosure is not limited to the above-described embodiment, and includes a modification of the above-mentioned embodiment and a combination of a plurality of embodiments as appropriate.

For example, when the detection target object is a compressor, a plurality of sensors 200 for measuring the pressure may be arranged at a plurality of positions of the compressor. When the detection target object is an axial flow compressor, a plurality of sensors 200 may be arranged in the circumferential direction of the outlet portion thereof. When the detection target object is a centrifugal compressor, a plurality of sensors 200 may be arranged in an annular direction. When detecting a sign of sudden change in vibration of the blade vibration, a plurality of sensors 200 may be arranged at the base of the blade.

When detecting a sign of sudden change in vibration of the shaft vibration, the sensor 200 may be arranged at each of different bearing positions. In this case, since the sensor arrangement is one-dimensional, the image data output by the output unit 140 may show a figure in which a plurality of nodes are linearly arranged and connected by a line.

If the detection target object is a steam turbine, a strain gauge may be used as the sensor 200. For example, a plurality of sensors 200 may be arranged at the base of a blade of a steam turbine arranged along the circumferential direction in the same stage.

If the detection target object is a rocket engine, there may be only one combustor. However, even in this case, a plurality of sensors 200 may be arranged in the circumferential direction of the outlet portion of the combustor so that the sign detection device 300 detects the sign of sudden change in vibration. When the detection target object is an aircraft, the method for detecting the sign of sudden change in vibration by the sign detecting device 300 may be applied to the engine or the blade thereof. By arranging the plurality of sensors 200 along the circumferential direction of the cross-section at the position where the combustion vibration occurs in this way, it is possible to detect signs of sudden change in vibration of various detection target objects.

The contents described in each of the above embodiments are grasped as follows, for example.

(1) A sign detection device according to the present disclosure includes: a plurality of sensors (200) disposed at a plurality of positions on a detection target object (for example, the gas turbine 20) and configured to measure physical quantities at each position; a data acquisition unit (110) for acquiring time-series fluctuation data of the physical quantity from the plurality of sensors (200); a calculation unit (120) for calculating, from the time-series fluctuation data, a parameter indicating a correlation between the physical quantities at arbitrary two positions among the plurality of positions; and a detection unit (130) for detecting a sign of sudden change in vibration of the detection target object based on the parameter.

According to the configuration described in (1), the sign of sudden change in vibration of the detection target object is detected based on the parameter indicating the correlation of the physical quantity between two positions. Therefore, it is possible to detect the sign sufficiently before the occurrence of the sudden change in vibration.

(2) In some embodiments, in the configuration of (1), the parameter is a correlation coefficient indicating a correlation between fluctuations of the physical quantities at each position.

According to the configuration described in (2), since the correlation coefficient indicating the correlation between the fluctuations of the physical quantity at each position is used as the parameter, the criterion for detecting the sign can be clarified. It is also possible to estimate a position that is highly related to the sudden change in vibration or its sign based on the magnitude of the parameter indicating the correlation. Such estimation results are useful information in the maintenance of the detection target object (for example, the gas turbine 20).

(3) In some embodiments, in the configuration of (2), the calculation unit (120) calculates the correlation coefficient for all combinations of two positions selected from the plurality of positions, and calculates link strength from a sum of the calculated correlation coefficients, and the detection unit (130) detects the sign of sudden change in vibration based on the link strength.

According to the configuration described in (3), since the link strength based on the correlation coefficient of all combinations of the plurality of positions is used for the sign detection, it is possible to perform sign detection that evaluates the overall state of the detection target object (for example, the gas turbine 20) instead of sign detection focusing on only between the specific positions of the detection target object.

(4) In some embodiments, in the configuration of (2) or (3), the calculation unit (120) calculates the correlation coefficient for all combinations of two positions selected from the plurality of positions, the sign detection device further including: an output unit (140) configured to output image data in which each position of the plurality of positions is associated with the correlation coefficient calculated for each combination of positions.

According to the configuration described in (4), the operator can visually grasp the state of the correlation coefficient between a plurality of positions based on the image data. As a result, it becomes possible to easily know the information necessary for operation monitoring or maintenance such as the presence of a sign of sudden change in vibration and the position related to the sign of sudden change in vibration.

(5) In some embodiments, in the configuration of (4), the image data is image data showing a figure in which the plurality of positions are arranged as a plurality of nodes and the nodes are connected by lines of different display formats according to a magnitude of the correlation coefficient.

According to the configuration described in (5), the operator can grasp the state of the correlation coefficient between a plurality of positions at a glance based on the image data.

(6) In some embodiments, in the configuration of (4), the calculation unit (120) calculates the correlation coefficient for all combinations of two positions selected from the plurality of positions, and calculates link strength from a sum of the calculated correlation coefficients, and the image data is image data showing a temporal change of the link strength.

According to the configuration described in (6), the operator can monitor the trend of the link strength and confirm the presence or absence of a sign of sudden change in vibration.

(7) In some embodiments, in the configuration of any one of (1) to (6), the detection unit (130) detects the sign of sudden change in vibration based on the parameter and amplitude information of the physical quantity indicated by the time-series fluctuation data.

According to the configuration described in (7), the detection unit (130) detects the sign of sudden change in vibration by combining the parameter indicating the correlation and the amplitude information of the physical quantity indicated by the time-series fluctuation data. Therefore, the detection accuracy can be improved. According to the findings of the inventors of the present application, for example, when the detection target object is the gas turbine (20), the same parameters (for example, link strength) are likely to suddenly change when the combustion temperature is high, whereas the parameters are less likely to suddenly change when the combustion temperature is low. In such a case, the accuracy can be improved when the sign of sudden change in vibration is detected by combining the parameter (for example, link strength) and the amplitude information of the physical quantity.

(8) A sign detection method according to the present disclosure includes: a step of measuring, by sensors (200) disposed at a plurality of positions on a detection target object (for example, the gas turbine 20), physical quantities at each position; a step of acquiring time-series fluctuation data of the physical quantities from a plurality of the sensors (200); a step of calculating a parameter indicating correlation between the physical quantities at arbitrary two positions among the plurality of positions from the time-series fluctuation data; and a step of detecting a sign of sudden change in vibration of the detection target object based on the parameter.

According to the configuration described in (8), the sign of sudden change in vibration of the detection target object (for example, the gas turbine 20) is detected based on the parameter indicating the correlation of physical quantities between two positions. Therefore, it is possible to detect the sign sufficiently before the occurrence of the sudden change in vibration.

REFERENCE SIGNS LIST

2 Combustor basket
3 Transition piece
4 Stator vane
6 Rotor blade
7 Compressor
8 Combustor
9 Fuel nozzle
20 Gas turbine
100 Arithmetic processing device
110 Data acquisition unit
120 Calculation unit
130 Detection unit
140 Output unit
200 Sensor
300 Sign detection device

The invention claimed is:

1. A sign detection device, comprising:
a plurality of sensors disposed at a plurality of positions along a circumferential direction of a cross-section at a position where a vibration can be detected in a detection target object and configured to measure physical quantities at each position, wherein
each of the plurality of sensors comprises at least one of a pressure sensor, a strain sensor, an acceleration sensor, a velocity sensor, and a displacement sensor, and
the detection target object comprises at least one of a gas turbine, a steam turbine, an engine, a boiler, an aircraft, or a compressor;
a data acquisition unit for acquiring time-series fluctuation data of the physical quantities from the plurality of sensors;
a calculation unit for calculating, from the time-series fluctuation data, a parameter indicating a correlation between the physical quantities at any two positions among the plurality of positions; and
a detection unit for detecting a sign of change in vibration of the detection object based on the parameter,
wherein the parameter is a correlation coefficient indicating a correlation between fluctuations of the physical quantities at each position,
wherein the calculation unit calculates the correlation coefficient for all combinations of two positions selected from the plurality of positions, and calculates link strength from a sum of an absolute value of the calculated correlation coefficients, and
wherein the detection unit detects the sign of change in vibration based on the link strength.

2. The sign detection device according to claim 1, wherein
the calculation unit calculates the correlation coefficient for all combinations of two positions selected from the plurality of positions, and
the sign detection device further comprises an output unit configured to output image data in which each position of the plurality of positions is associated with the correlation coefficient calculated for each combination of positions.

3. The sign detection device according to claim 2, wherein the image data is image data showing a figure in which the plurality of positions are arranged as a plurality of nodes and the nodes are connected by lines of different display formats according to a magnitude of the correlation coefficient.

4. The sign detection device according to claim 2, wherein
the calculation unit calculates the correlation coefficient for all combinations of two positions selected from the plurality of positions, and calculates link strength from a sum of the calculated correlation coefficients, and
the image data is image data showing a temporal change of the link strength.

5. The sign detection device according to claim 1, wherein the detection unit detects the sign of change in vibration based on the parameter and amplitude information of the physical quantity indicated by the time-series fluctuation data.

6. A sign detection method, comprising:
a step of measuring, by sensors disposed at a plurality of positions along a circumferential direction of a cross-section at a position where a vibration occurs can be detected in a detection target object, physical quantities at each position, wherein
each of the plurality of sensors comprises at least one of a pressure sensor, a strain sensor, an acceleration sensor, a velocity sensor, and a displacement sensor, and
the detection target object comprises at least one of a gas turbine, a steam turbine, an engine, a boiler, an aircraft, or a compressor;
a step of acquiring time-series fluctuation data of the physical quantities from the sensors;
a step of calculating a parameter indicating correlation between the physical quantities at any two positions among the plurality of positions from the time-series fluctuation data; and
a step of detecting a sign of change in vibration of the detection target object based on the parameter,
wherein the parameter is a correlation coefficient indicating a correlation between fluctuations of the physical quantities at each position, wherein in the step of calculating the parameter, the correlation coefficient for all combinations of two positions selected from the plurality of positions is calculated, and link strength from a sum of an absolute value of the calculated correlation coefficients is calculated, and wherein a detection unit detects the sign of change in vibration based on the link strength.

* * * * *